(12) United States Patent
Blanding et al.

(10) Patent No.: US 10,759,519 B2
(45) Date of Patent: Sep. 1, 2020

(54) ADAPTIVE FEEDBACK CONTROL OF FORCE FIGHTING IN HYBRID ACTUATION SYSTEMS

(71) Applicant: The Boeing Company, Chicago, IL (US)

(72) Inventors: David Blanding, Belton, SC (US); Jeffrey Coffman, Huntington Beach, CA (US); Jimmy Quiambao, Walnut, CA (US); Neal Van Huynh, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 364 days.

(21) Appl. No.: 15/799,724

(22) Filed: Oct. 31, 2017

(65) Prior Publication Data
US 2019/0127049 A1 May 2, 2019

(51) Int. Cl.
*B64C 13/40* (2006.01)
*B64C 13/50* (2006.01)
(Continued)

(52) U.S. Cl.
CPC ............... *B64C 13/40* (2013.01); *B64C 9/00* (2013.01); *B64C 13/50* (2013.01); *B64C 13/505* (2018.01);
(Continued)

(58) Field of Classification Search
CPC ....... B64C 13/40; B64C 13/50; B64C 13/505; B64C 2009/005; B64C 9/00; G05B 13/048
(Continued)

(56) References Cited

U.S. PATENT DOCUMENTS 6,052,647 A * 4/2000 Parkinson ............... G01S 19/11
342/357.36
6,208,914 B1 * 3/2001 Ward ................... G05B 13/042
701/3
(Continued)

FOREIGN PATENT DOCUMENTS

CN 104265708 A 1/2015

OTHER PUBLICATIONS

"European Application Serial No. 18187997.4, Search Report dated Apr. 23, 2019", 14 pgs.
(Continued)

*Primary Examiner* — Angelina Shudy
(74) *Attorney, Agent, or Firm* — Kwan & Olynick LLP

(57) ABSTRACT

Systems for compensating for force fighting in multi-actuator systems are provided. A drive controller unit comprises a first feedforward controller in communication with a first actuator and configured to receive a drive command signal. A first feedback regulator is configured to output a first feedback input into the first feedforward controller, and to receive as input a first actuator position and a first actuator force. The drive controller unit further comprises a second feedforward controller in communication with a second actuator and configured to receive the drive command signal. A second feedback regulator is configured to output a second feedback input into the second feedforward controller, and to receive as input a second actuator position and a second actuator force. The drive controller unit utilizes both feedforward controllers and both feedback regulators to minimize force fighting while driving a common aileron.

30 Claims, 9 Drawing Sheets

(51) Int. Cl.
    *G05B 13/04*     (2006.01)
    *B64C 9/00*     (2006.01)

(52) U.S. Cl.
    CPC ...... *G05B 13/048* (2013.01); *B64C 2009/005* (2013.01)

(58) Field of Classification Search
    USPC .......................................................... 701/3
    See application file for complete search history.

(56) References Cited

U.S. PATENT DOCUMENTS

| | | | |
|---|---|---|---|
| 8,245,967 B2 | 8/2012 | Kirkland | |
| 9,397,587 B2 | 7/2016 | Youcef-Toumi et al. | |
| 2004/0159100 A1* | 8/2004 | Bernard | B64C 13/12 60/325 |
| 2006/0064291 A1* | 3/2006 | Pattipatti | G05B 23/0251 703/14 |
| 2010/0268353 A1* | 10/2010 | Crisalle | G05B 13/048 700/29 |
| 2011/0089884 A1* | 4/2011 | Harke | G05B 19/404 318/625 |
| 2011/0108671 A1 | 5/2011 | Soronda | |
| 2013/0158680 A1* | 6/2013 | Fuller | G05B 13/048 700/29 |
| 2017/0283040 A1* | 10/2017 | Judey | B64C 13/505 |
| 2017/0349267 A1* | 12/2017 | Venkataraman | B64C 39/024 |
| 2018/0362149 A1* | 12/2018 | Huynh | B64C 13/42 |

OTHER PUBLICATIONS

"Linear-quadratic-Gaussian control", Wikipedia, Retrieved from the Internet on Mar. 28, 2019: URL:https://en.wikipedia.org/w/index.php?title=Linear-quadratic-Gaussian_control&oldid=803857517, Oct. 2017, 4 pgs.

Cun, Shi et al., "Adaptive decoupling synchronous control of dissimilar redundant actuation system for large civil aircraft", Aerospace Science and Technology, vol. 47, Dec. 2015, pp. 114-124.

Waheed, Ur R. et al., "Motion synchronization in a dual redundant HA/EHA system by using a hybrid integrated intelligent control design", Chinese Journal of Aeronautics, vol. 20, No. 3, Dec. 2015, pp. 789-798.

Wang, Jun et al., "Active fault tolerant control for vertical tail damaged aircraft with dissimilar redundant actuation system", Chinese Journal of Aeronautics, vol. 29, No. 5, Aug. 2016, pp. 1313-1325.

Guo, Lili et al., "Multi-mode Switching Control for HSA/EHA Hybrid Actuation System", Applied Mechanics and Materials, 2014, pp. 1088-1093.

Roben, Tobias et al., "An Innovative All-Active Hybrid Actuation System", AIAA Aviation Forum, Jun. 2015, 13 pgs.

Shi, Cun et al., "Adaptive decoupling synchronous control of dissimilar redundant actuation system for large civil aircraft", Aerospace Science and Technology 47, 2015, pp. 114-124.

Waheed, Ur R. et al., "A Position Synchronization Control for HA/EHA System", International Conference on Fluid Power and Mechatronics, Aug. 2015, 10 pgs.

* cited by examiner

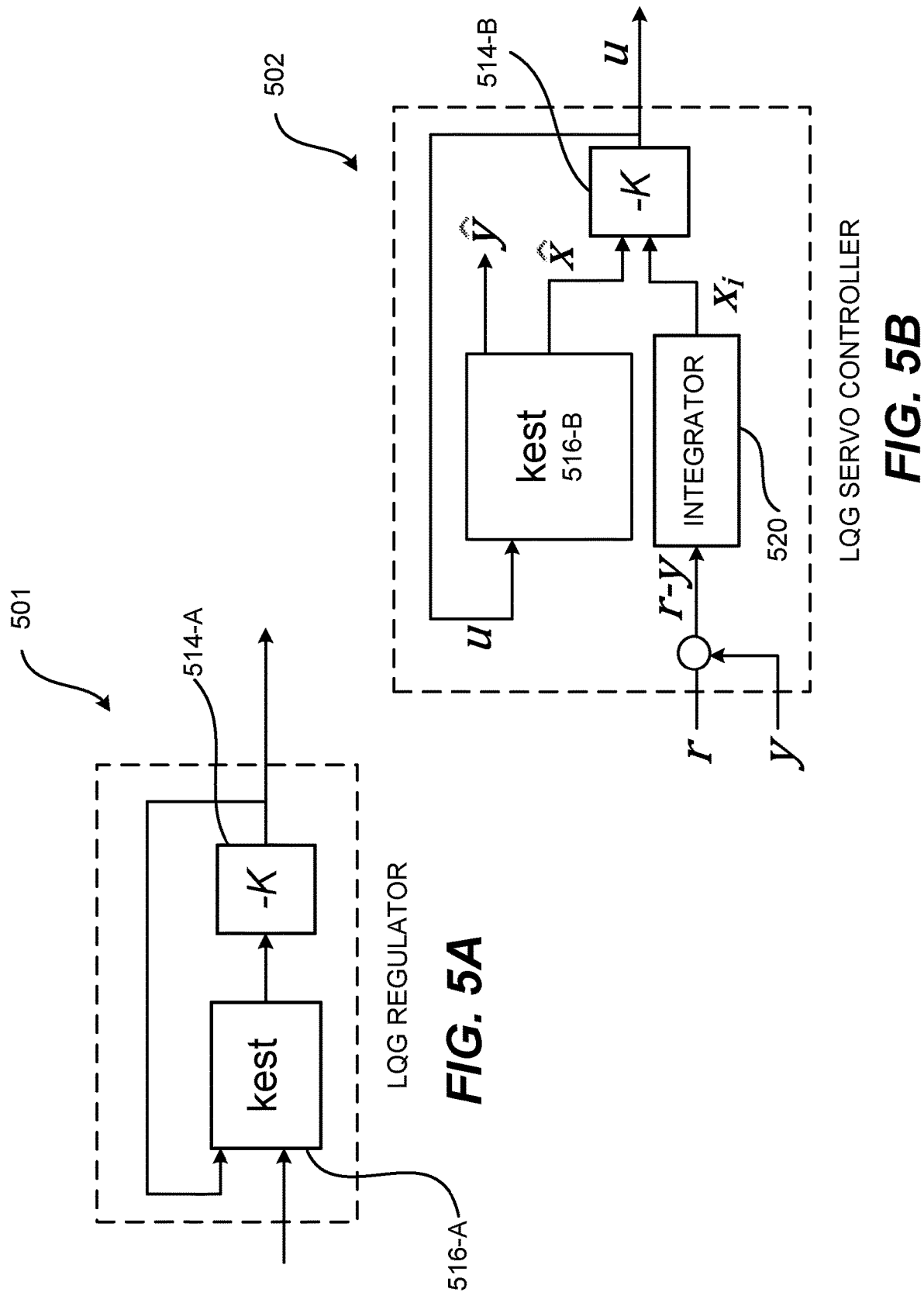
FIG. 5A  LQG REGULATOR
FIG. 5B  LQG SERVO CONTROLLER

ADAPTIVE FEEDBACK CONTROL OF FORCE FIGHTING IN HYBRID ACTUATION SYSTEMS

TECHNICAL FIELD

The present disclosure relates generally to hybrid actuation systems implementing fluid pressure and electromechanical actuators, and more specifically to systems for operational force fighting compensation.

BACKGROUND

During the operation of multiple actuators on a common control surface, manufacturing tolerances could cause a difference in the dynamic behavior of the actuators thus leading to a condition of force fighting. The force fighting is generated because the actuators do not share the load equally. This condition is possible even if the actuator is controlled by similar primary power source such as hydraulics. When multiple actuators are operating in a hybrid actuation system with two distinct primary power sources (hydraulic and electric), the potential for unequal load sharing (force fighting) is magnified.

Force fighting is basically due to differences in response between the two similar or dissimilar actuators operating on a common aircraft flight control surface. In the case of a hybrid actuation system (electric actuator and hydraulic actuator), the biggest problem in a hybrid actuation system is force fighting. Force fighting gone unaddressed can create severe structural damage and or component failure. Thus, there exists a need for systems and methods for eliminating or limiting force fighting to acceptable limits in order to improve the system energy efficiency, reliability, and satisfy fatigue requirements.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide systems and methods for compensating for, or eliminating or limiting force fighting in multi-actuator systems. According to various embodiments, a drive controller unit is provided comprising a first feedforward controller configured to receive a drive command signal. The first feedforward controller is in communication with a first actuator. The drive controller unit further comprises a first feedback regulator configured to output a first feedback input into the first feedforward controller. The first feedback regulator is further configured to receive as input a first actuator position and a first actuator force.

The drive controller unit further comprises a second feedforward controller configured to receive the drive command signal. The second feedforward controller is in communication with a second actuator. The drive controller unit further comprises a second feedback regulator configured to output a second feedback input into the second feedforward controller. The second feedback regulator being further configured to receive as input a second actuator position and a second actuator force. The drive controller unit utilizes both feedforward controllers and both feedback regulators to minimize force fighting while driving a common aileron.

The feed forward controllers include an internal plant model that predicts actuator behavior. The feed forward controllers include an internal optimizer configured to construct and solve a constrained optimization problem at control interval k. The feedforward controllers may include local feedback compensators that account for compensating against differences in static and dynamic forces between the first and second actuators.

The feedback regulators are configured as inner loop noise suppressors and plant disturbance compensators. The feedback regulators are configured as linear quadratic Gaussian controllers (LQGs). The LQGs include a linear quadratic regulator (LQR) and a Kalman estimator. The Kalman estimator takes as input U(k) and Y(k) and outputs X(k), which is fed back into the LQR as input. U(k) is the output of the LQR and Y(k) is the output of an actuator plus torque disturbance. Y(k) corresponds to position, current speed, force, and pressure and is fed back into the feedforward controller as additional input.

The drive controller unit is further configured to reject fast dynamic transient force fighting using digital filter and forward looking algorithms that anticipate and null position, force, and force fight transients.

In yet another embodiment of the present disclosure, an aircraft is provided comprising a processor, and aileron, a first actuator, and a second actuator. The aircraft further comprises a first feedforward controller configured to receive a drive command signal. The first feedforward controller is in communication with a first actuator. The aircraft further comprises a first feedback regulator configured to output a first feedback input into the first feedforward controller. The first feedback regulator is further configured to receive as input a first actuator position and a first actuator force.

The aircraft further comprises a second feedforward controller configured to receive the drive command signal. The second feedforward controller is in communication with a second actuator. The aircraft further comprises a second feedback regulator configured to output a second feedback input into the second feedforward controller. The second feedback regulator being further configured to receive as input a second actuator position and a second actuator force. The aircraft utilizes both feedforward controllers and both feedback regulators to minimize force fighting while driving the aileron.

The aircraft is further configured to reject fast dynamic transient force fighting using digital filter and forward looking algorithms that anticipate and null position, force, and force fight transients.

In still yet another embodiment of the present disclosure, a force fighting compensation system is provided comprising a first feedforward controller configured to receive a drive command signal. The first feedforward controller is in communication with a first actuator. The force fighting compensation system further comprises a first feedback regulator configured to output a first feedback input into the first feedforward controller. The first feedback regulator is further configured to receive as input a first actuator position and a first actuator force.

The force fighting compensation system further comprises a second feedforward controller configured to receive the drive command signal. The second feedforward controller is in communication with a second actuator. The force fighting compensation system further comprises a second feedback regulator configured to output a second feedback input into the second feedforward controller. The second feedback regulator being further configured to receive as input a second actuator position and a second actuator force. The force fighting compensation system utilizes both feedforward controllers and both feedback regulators to minimize force fighting while driving the aileron.

The force fighting compensation system is further configured to reject fast dynamic transient force fighting using digital filter and forward looking algorithms that anticipate and null position, force, and force fight transients.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIG. 5A illustrates an example of an LQG regulator, in accordance with one or more embodiments.

FIG. 5B illustrates an example of an LQG Servo Controller, in accordance with one or more embodiments of the present disclosure.

DETAILED DESCRIPTION OF PARTICULAR EMBODIMENTS

Figure 1:
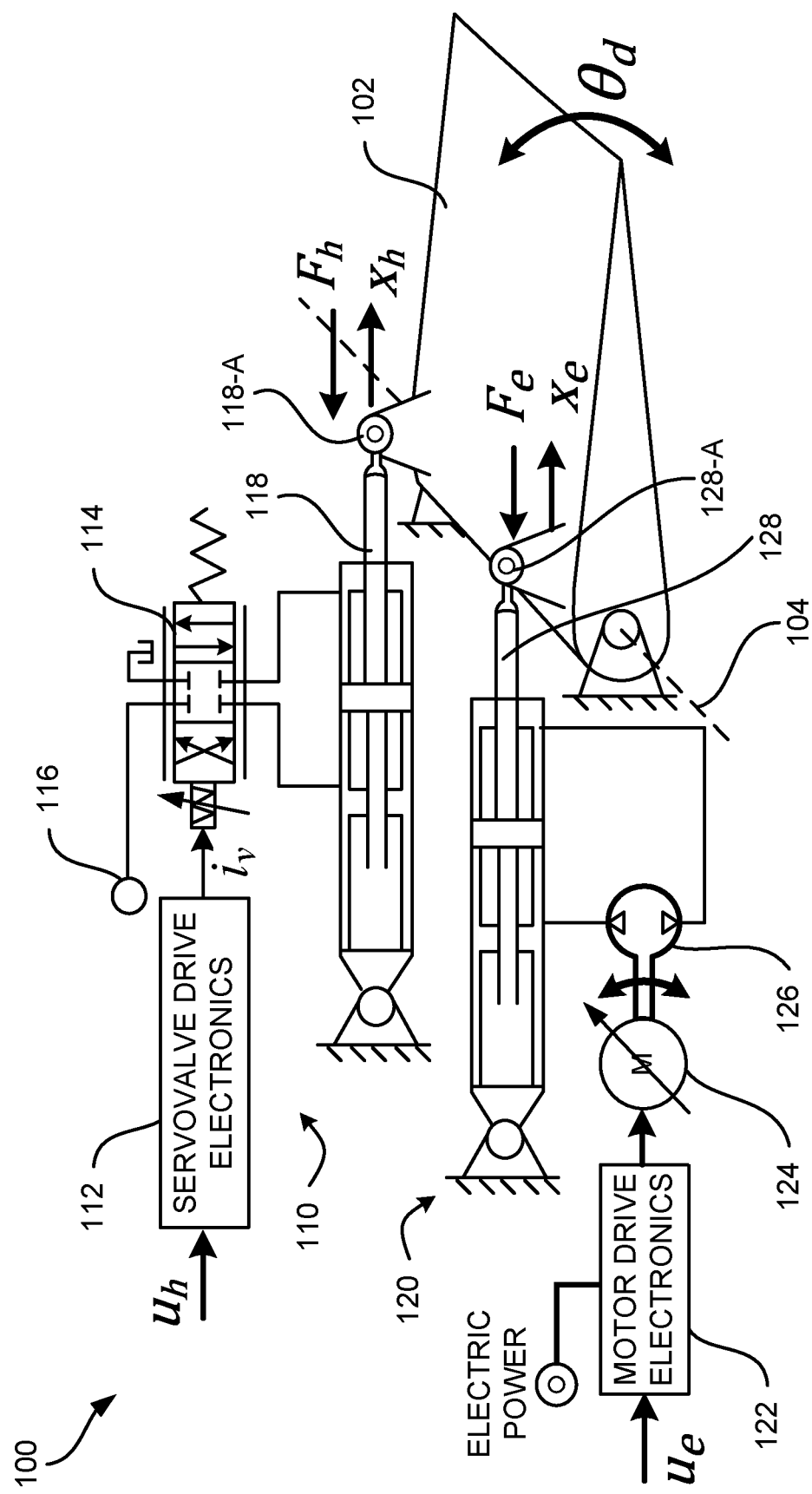
FIG. 1 illustrates an example hybrid actuation system, in accordance with one or more embodiments.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

In a hybrid actuation system, a combination of actuators may be implemented, including electromechanical actuators, electro-hydrostatic actuators, and electro-hydraulic servo actuators. In the case of a hybrid actuation system, the biggest problem in a hybrid actuation system is force fighting, which can create severe structural damage and or component failure over time if gone unaddressed. Force fighting in a system may be caused by differences in response between the two similar or dissimilar actuators operating on a common aircraft flight control surface.

Since dynamic response of an electric actuator is generally slower than that of the hydraulic actuator, synchronizing the two actuators in a hybrid actuation system is very important. In some cases, to effectively achieve fast dynamic response, a feed-forward compensator is required to eliminate the influence of the difference between the electric and hydraulic actuators. In some cases both the actuators are under position control and position synchronization which help to decrease force fighting. There are also force fighting control schemes which are based on a system feedback correction theory that can cater to the demands of dynamic characteristics and switch transients. However, the common pitfalls of existing solutions is the unpredictability of unstable operational conditions, degraded systems conditions, or worst case disturbances and noise that often lead to unstable consequences.

The systems and methods described herein provide an adaptive feedback control of force fighting in hybrid actuation systems, which is an innovative force fighting concept that provides optimum feedback compensation of actuator force fighting through the integration of Linear-Quadratic-Gaussian (LQG) control as well as the adaptive feedforward compensation using Model Predictive Control (MPC). These controllers implement look-ahead (previewing) on reference and measured disturbance trajectories. Regulation and tracking are achieved using look-ahead (previewing beyond the horizon) where position output tracks the reference command while rejecting force fight disturbances. Thus, the stability of a system is maintained, even under worst case input and output disturbances and noise.

For very wide variation of force fight errors, the disclosed methods and systems for adaptive feedback control of hybrid actuation systems ensures that the resulting force fight is negligible or limited to minimum acceptable limits, that the system is maintained with operating limits, and that the system is stable under any input/output disturbances and nose, and at any degraded conditions of the system.

EXAMPLE EMBODIMENTS

Current actuator technologies being used on today's military and commercial aircraft consist of a combination of electro hydraulic servo-actuators (EHSA), electro-hydrostatic actuators (EHA) or electromechanical actuators (EMA). Commercial airplanes are moving toward the implementation of hybrid actuation system to control primary and secondary flight control surface where the primary power source may be hydraulic and electric.

FIG. 1 illustrates an example hybrid actuation system 100, in accordance with one or more embodiments. In various embodiments, system 100 may be implemented to move a control surface 102. In some embodiments, control surface 102 may be any one of various moveable parts of an aircraft, such ailerons, weapons systems, landing gear, etc., or a portion thereof. In other embodiments, control surface 102 may be any one of various moveable parts of various other vehicles, including land and sea vehicles. System 100 may include one or more actuators that act on control surface 102. For example, system 100 includes actuators 110 and 120. In some embodiments, actuators 110 and 120 may act on control surface 102 to cause an angular displacement $\theta_d$ about an axis 104.

In some embodiments, each one of actuators 110 and 120 may be any one of various actuators, including, but not limited to, an electro hydraulic servo-actuator (EHSA), electro-hydrostatic actuator (EHA), electromechanical actuator (EMA), etc. As described herein, an electro hydraulic servo-actuator (EHSA) may also be referred to as a servo-hydraulic actuator (SHA); these terms may be used interchangeably. As shown in FIG. 1, system 100 is a hybrid actuation system comprising different actuator types, where actuator system 110 is an EHSA and actuator system 120 is an EHA.

The mechanics of hydraulic actuators (EHSA) comprise of a pump that flows incompressible fluid into a hollow cylinder forcing a piston 118 to move inside of the hollow cylinder. As the pressure is increased, the piston 118 is likewise moved along the axis of that cylinder and creates a retracting linear force. In various embodiments, a servo valve applied voltage $u_h$ may be applied to servo-valve drive electronics 112 of EHSA 110, which produced valve current $i_v$. The valve current $i_v$ operates servo valve 114 which utilizes hydraulic power from hydraulic power source 116 to operate a rod end 118-A of EHSA 110 to produce an EHSA output force $F_h$. This may cause a position transfer function $x_h$ corresponding to the angular displacement $\theta_d$. Unique valving networks, such as that within servo valve 114, can be commanded to supply fluid supplied to the piston's opposite side causing it to create an extending linear force (opposite to EHSA output force $F_h$).

The mechanics of an electrical actuator (such as an EHA and EMA) are quite different. Typically implementation of an electrical actuator entails conversion of the electric energy into torque by a mechanically-connected electric motor turning a hydraulic pump or thread lead-screw (ball screw or roller screw). In various embodiments, an EHA applied voltage $u_e$ is applied to motor drive electronics 122 of EHA 120, which provides electric power to a variable speed motor 124 to operate a fixed displacement hydraulic pump 126. As the screw rotates, the nut is driven along the threads. The direction by which the nut moves is dependent upon the direction where the screw rotates, which likewise allows the actuator to extend or retract. The pump 126 may operate a rod end 128-A of a piston 128 of EHA 120 to produce an EHA output force $F_e$ retracting the actuator. This may cause an EHA position function $x_e$ corresponding to the angular displacement $\theta_d$.

The major difference between a hydraulic (EHSA) versus an electrical actuator (EHA or EMA) is the primary power source. The EHSA requires multiple power conversion where an engine mounted gearbox converts mechanical power to drive a hydraulic pump to produce hydraulic power with electrical control. EHA and EMA systems require only electrical power from an engine mounted generator with electrical control.

During the operation of multiple types of actuators, such as actuators 110 and 120, on a common control surface 102, manufacturing tolerances could cause a difference in the dynamic behavior of the actuators thus leading to a condition of force fighting. The force fighting is generated because the actuators do not share the load equally. This condition is possible even if the actuators are controlled by similar primary power source, such as hydraulics.

When multiple actuators are operating in a hybrid actuation system with two distinct primary power sources (for example hydraulic and electric as shown in FIG. 1), the potential for unequal load sharing (force fighting) is magnified. In a hybrid actuation system, such as system 100, which may utilize an EHSA/EHA or EHSA/EMA configuration, the hydraulic and electric power sources must control the actuators operating in an active/active mode. This may generate a major concern that force fight, if not addressed properly, can and will exist between the two actuator technologies. This is because of the dissimilar technology and setting/manufacturing tolerances, the static and dynamic behaviors between actuators are so different that they do not share the load equally and often fight one against another to position the load; thus, altering their transient responses and introducing transient noise, torque disturbances, and position offsets.

Force Fighting may also be caused by the physical differences in power conversion and inertias between EHSA and electric actuator (EHA/EMA), the dynamics of these actuators are inherently different. This difference can lead to dynamic force fighting effects if operated on the same control surface. The spin up of the electric motor controlling the hydraulic pump or gearbox/lead-screw will cause the electric actuator to react slower to input changes. In some cases large inputs commands may create a conditions where the velocity of the electric actuator (EHA/EMA) exceeds the maximum velocity of the EHSA which is naturally limited.

A mathematical description of the force fight dynamics using a transfer function relationship between the input and output signals of the two actuators may be approximated by the following equations. The EHSA position transfer function $X_h$ and the EHA position transfer function $X_e$ may be determined by:

$$X_h = \frac{x_r - H_2(s)F_h}{H_1(s)}$$

$$X_e = \frac{x_r - E_2(s)F_e}{E_1(s)}$$

where $x_r$ is the position demand; $E_1(s)$ is the input rejection function of the EHA; $E_2(s)$ is the disturbance transfer function of the EHA; $H_1(s)$ is input rejection function of the EHSA; $H_2(s)$ is the disturbance transfer function of the EHSA.

A mathematical description of the force fight dynamics may be provided using EHA transfer function $X_e$ and EHSA transfer function $X_h$. The relationship between the input and output signals of the two actuators may be determined by:

$$e_f = K\left(\frac{x_r - H_2(s)F_h}{H_1(s)} - \frac{x_r - E_2(s)F_e}{E_1(s)}\right)$$

Thus, in order to improve the system energy efficiency, reliability, and satisfy fatigue requirements, a force fight system has been developed that can be used in an active/active mode to satisfy the fatigue requirement (for the actuation load loop of fly-by-wire (FBW) actuation system). A force fight system may be used in an active/active actuation with redundant actuators operating on a common surface. Currently there are no aircraft that implement a hybrid power actuation architecture with active/active actuation. Thus the present disclosure provides a unique force fight algorithm so the fatigue requirement can be met.

Figure 2:
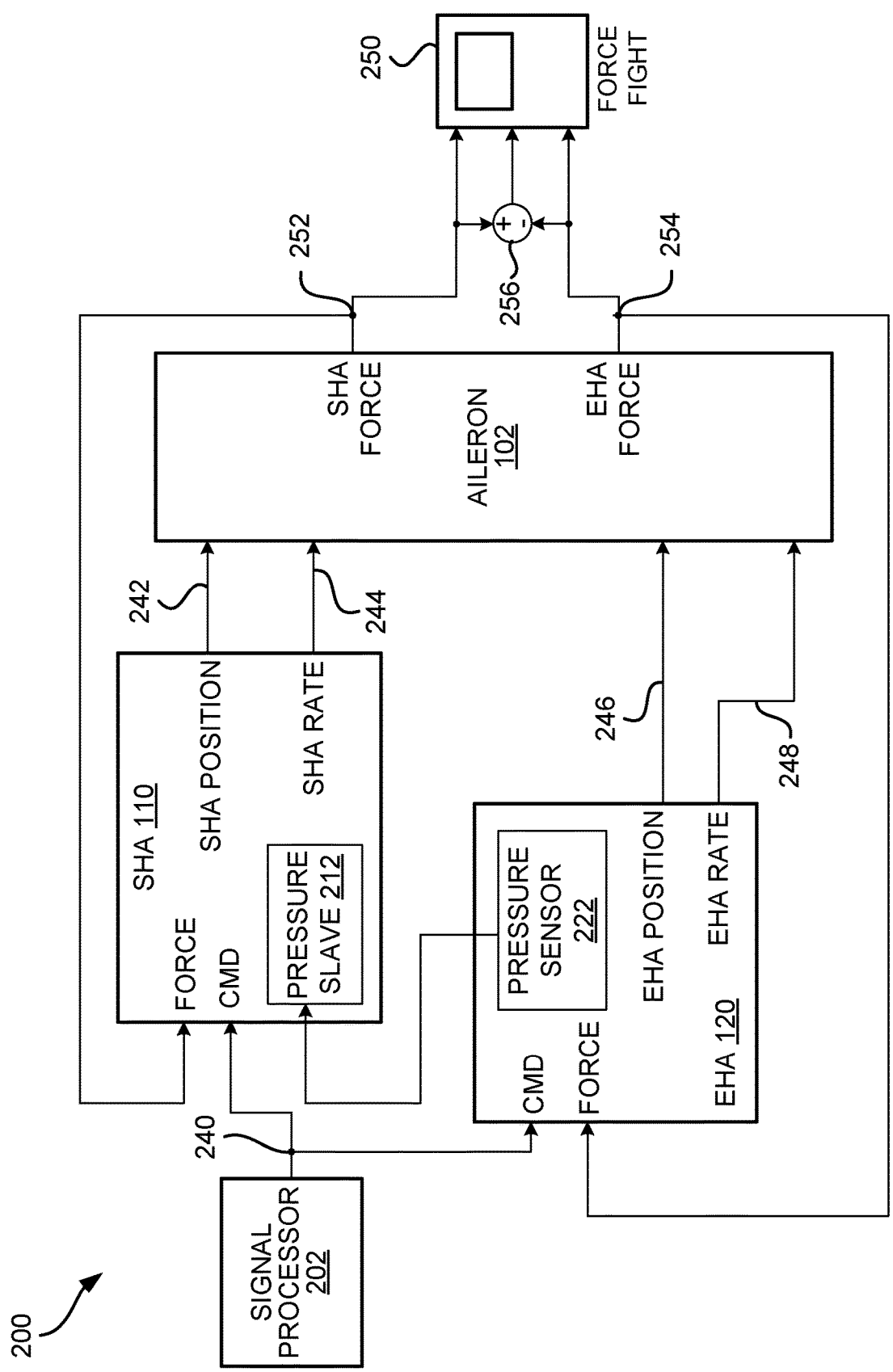
FIG. 2 illustrates an example system implementing a traditional approach to hybrid actuator systems, in accordance with one or more embodiments of the present disclosure.

FIG. 2 illustrates an example system 200 implementing a traditional approach to hybrid actuator systems, in accordance with one or more embodiments. In various embodiments, system 200 may demonstrate a hybrid system including a SHA 110 and an EHA 120 acting on the surface of aileron 102. An input command 240 is sent by signal processor 202 to the actuator controllers of SHA 110 and EHA 120. The command 240 may cause a change in position 242 of the piston of SHA 110 at a particular rate 244 causing a corresponding change in position at aileron 102 at a corresponding rate. Similarly, signal processor 202 may issue an input command 240 to cause a change in position 246 of the piston of EHA 120 at a particular rate 248 causing a corresponding change in position at aileron 102 at a corresponding rate. As such, a SHA force 252 and EHA force 254 is applied to aileron 102. As previously described, differences in actuator operation may cause force fighting. The difference in output forces 252 and 254 may be measured and summed at 256 to determine the amount of force fighting. The measured force fighting, and the measured output forces 252 and 254, may then be transmitted to a user display 250 for monitoring.

In some embodiments, SHA 110 and EHA 120 may be configured in an open loop position in which SHA 110 and EHA 120 are uncoupled. In other embodiments, SHA 110 and EHA 120 may be configured in a closed loop position in which SHA 110 is slaved to the EHA pressure output via pressure slave 212, such as shown in FIG. 2. In some embodiments, system 200 may implement a proportional-integral-derivative (PID) controller to establish synchronization between actuators. In some embodiments, synchronization between actuators in system 200 may be achieved using pressure sensor 222 from EHA 120 to equalize the pressure going into the actuator cylinder of SHA 110 via pressure slave 212 to match the output SHA position 242 and SHA rate 244 with the output EHA position 246 and EHA rate 248. The output force 252 of SHA 110 and the output force 254 of EHA may be measured by sensors on aileron 102. The output force from each actuator is additionally fed back into the respective actuator controllers to adjust the input command into each individual system to stabilize and correct the position of the aileron 102.

Under the traditional approach to managing hybrid actuation, such as in system 200, there may be little force fighting that occurs when no noise or loop disturbances are present. For example, there is very little force fighting in an open loop configuration with no noise or loop disturbance. However, the traditional approach fails to compensate for noise or loop disturbances, such as an offset between command inputs to the actuators, are introduced. For example, in an open loop configuration, where both actuators track the reference command input, a 10% noise or disturbance may result in static force fight that equals approximately the nominal peak output force (or 100% force fight) from the system.

In a closed loop scenario, such as in system 200 shown in FIG. 2, significant force fighting may occur during rise and fall times of aileron 102, which may be more prominent at high output loading. In a closed loop scenario, static force fight may be suppressed; however, dynamic force fight may result from the delayed response of the SHA 110 when tracking the output pressure coming from the EHA 120. If noise, loop disturbance, or high load is added to this scenario, both static and dynamic force fight are again created. In summary, the traditional approach of using PID compensators and controllers was found ineffective, resulting in worst case scenarios with static and dynamic force fight when dealing with noise and loop disturbances.

Research has shown that when EHSA and electric actuator (EHA/EMA) are coupled in a hybrid configuration, the EHSA pulls the electric actuator for small step-inputs, while the electric actuator pulls the EHSA for large step-inputs. In this case significant force fighting can occur, because the EHSA reacts faster to input changes.

Figure 3A:
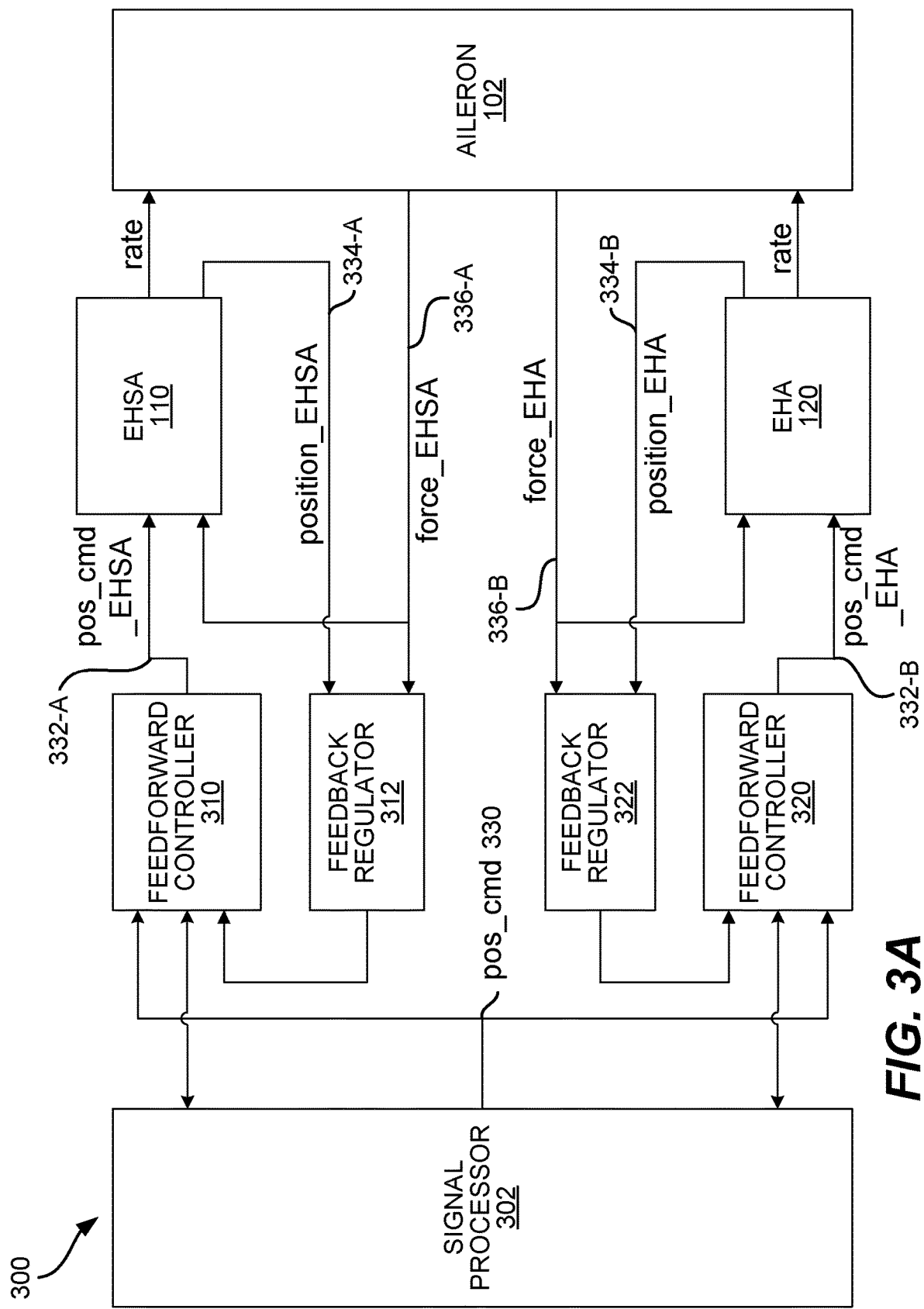
FIG. 3A illustrates an example of an adaptive feedforward compensation (AFFC) system, in accordance with one or more embodiments.

Conventional PID systems may include two-degree-of-freedom (2-DOF) PID controllers that include set-point weighting on the proportional and derivative terms. A 2-DOF PID controller is capable of fast disturbance rejection without significant increase of overshoot in set-point tracking. 2-DOF PID controllers are also useful to mitigate the influence of changes in the reference signal on the control signal. The relationship between the 2-DOF controller's output and inputs can be represented in either feedforward or feedback PID configurations. The two forms differ in the parameters used to express the proportional, integral, and derivative actions of the controller. However, the disadvantage of these controllers are limited gain, bandwidth, and stability margins due to perturbations resulting from model parameter changes, high loads, noise, and disturbances To improve mitigation of such force fight conditions, an adaptive feed-forward compensation (AFFC) system may be implemented with integration of a Model Predictive Controller (MPC) and Linear Quadratic Gaussian (LQG) controller. With reference to FIG. 3A, shown is an example adaptive feed-forward compensation (AFFC) system 300, in accordance with one or more embodiments. As in systems previously described above, system 300 may include multiple actuators, such as EHSA 110 and EHA 120 acting on aileron 102.

System 300 refines the traditional approach by enabling faster synchronization of the output position and force of the actuators so as to minimize force fighting. In various embodiments, system 300 includes adaptive feedforward (FF) controllers 310 and 320. In some embodiments, system 300 may further comprise optimal gain feedback regulators 312 and 322. As shown in FIG. 3A, feedforward controller 310 and feedback regulator 312 operate to adjust operation of EHSA 110, while feedforward controller 320 and feedback regulator 322 operate to adjust operation of EHA 120.

A position command 330, or other input command, may be transmitted from signal processor 302 to feedforward controllers 310 and 320. In some embodiments, feedforward controllers work on local feedback compensators accounting for compensating against the difference in static and dynamic forces between actuators 110 and 120, which may be exasperated by one or more of the following: noise, disturbances, and output loading. These feed forward controllers may synchronize the positions and output forces from each actuator. An EHSA position command 332-A may be issued from feedforward controller 310 to EHSA 110. Similarly, an EHA position command 332-B may be issued from feedforward controller 320 to EHA 120. The position commands 332-A and 332-B may be synchronized by corresponding feedforward controllers 310 and 320 such that actuators act on aileron 102 with appropriate positioning and rate to reduce force fighting.

In addition, optimal gain feedback regulators are added as inner loop noise suppressors and plant disturbance compensators since the feedforward controllers may not operate fast enough to account for high frequency transient force fighting. The positioning of the actuators may be measured by sensors on the corresponding actuator. An EHSA position 334-A may be determined at EHSA 110 and sent to feedback regulator 312. An EHA position 334-B may be determined at EHA 120 and sent to feedback regulator 322. Similarly, the force applied to aileron 102 by each actuator may also be measured by sensors located on aileron 102. The EHSA force 336-A may be determined at aileron 102 and sent to feedback regulator 312. The EHA force 336-B may be determined at aileron 102 and sent to feedback regulator 322. In various embodiments, the optimal gain feedback regulators require a command signal to force the output to state (0) when the output of the actuators are non-zero at the null position due to input noise or torque disturbances. In some embodiments, the feedback regulators force use the measured states, as well as estimations for unmeasured states, to force the output to state (0).

Thus, system 300 is able to reject fast dynamic transient force fighting by using digital filter and forward looking algorithms that anticipates and nulls position, force, and force fight transients. System 300 may also be implemented using conventional or predictive approach to achieve, stability, regulation, and tracking.

Traditional approach is normally implemented using PID compensators. However, these compensators have fixed bandwidth and gain margins. Thus, such PID compensators would not be able to quickly regulate a command signal to force the output of the actuators to state (0), which would require very high input energy that would destabilize traditional controllers if used.

Figure 3B:
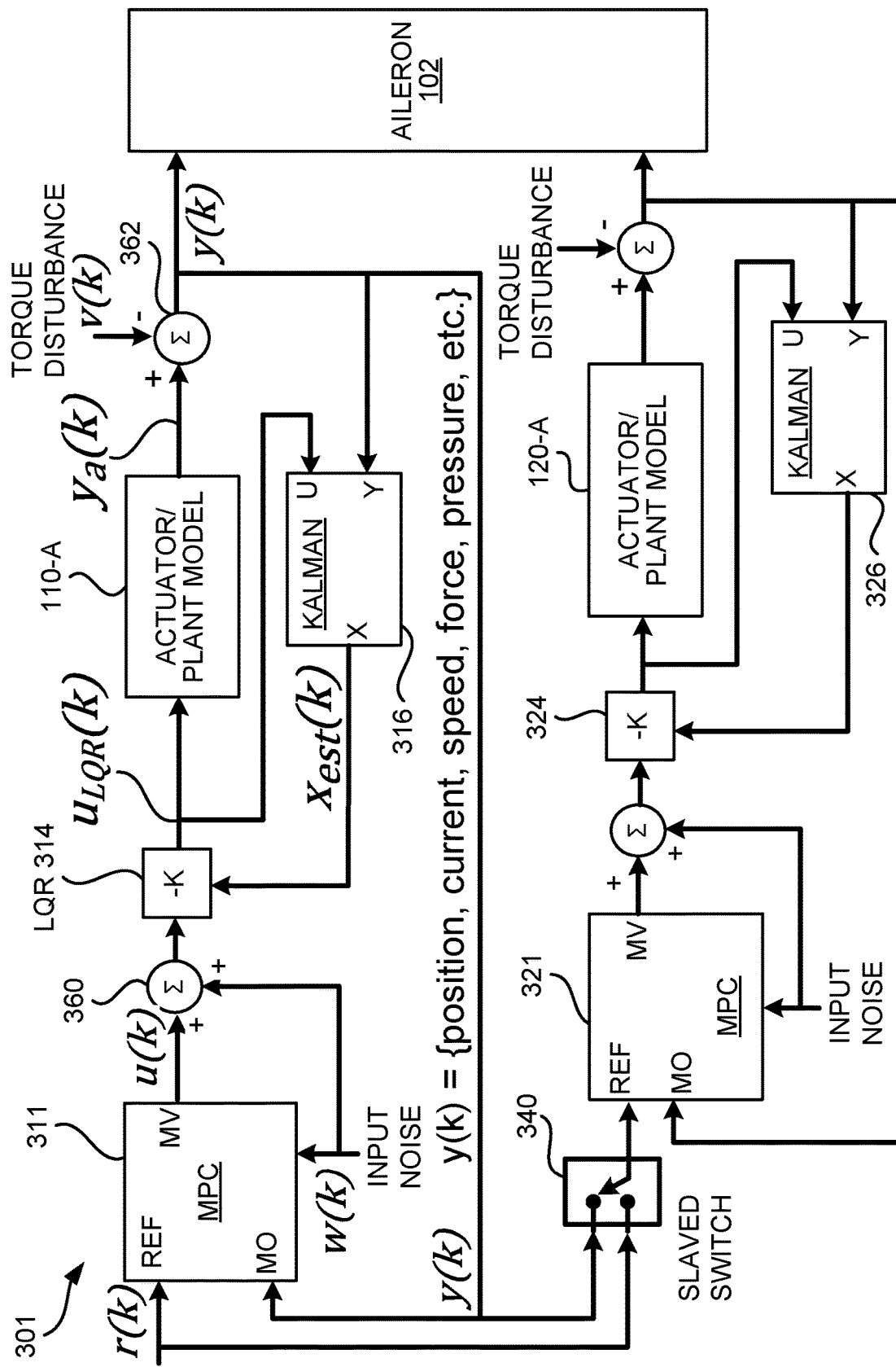
FIG. 3B illustrates another example of an adaptive feedforward compensation (AFFC) system, in accordance with one or more embodiments.

With reference to FIG. 3B, shown is another example adaptive feed-forward compensation (AFFC) system 301, in accordance with one or more embodiments. In various embodiments, AFFC system 301 includes Model Predictive Controllers (MPC) as feedforward controllers, and optimal gain Linear Quadratic Gaussian (LQG) Controllers as feedback regulators. In some embodiments, MPC 311 may be feedforward controller 310 and MPC 321 may be feedforward controller 320. In some embodiments, an LQG controller may comprise a linear quadratic regulator (LQR) and a Kalman filter. As used herein, an LQR may also be referred to as an optimal gain compensator, and a Kalman filter may also be referred to as a Kalman estimator. In some embodiments, an LQG controller comprising LQR 314 and Kalman filter 316 may be feedback regulator 312. In some embodiments, an LQG controller comprising LQR 324 and Kalman filter 326 may be feedback regulator 322.

System 301 may include actuators 110-A and 120-A controlling position of aileron 102. As previously described, actuators 110-A and 120-A may be any one of various actuator types, including hydraulic actuators such as an EHSA, or electric actuators such as an EHA or an EMA. As shown in FIG. 1, actuator 110-A may be an EHSA 110 and actuator 120-A may be an EHA 120. Each actuator, 110-A and 120-A, may be controlled by an MPC and an LQG controller. As shown in FIG. 3B, actuator 110-A is controlled by MPC 311 and an LQG that comprises LQR 314 and Kalman filter 316. Actuator 120-A is controlled by MPC 321 and an LQG comprising LQR 324 and Kalman filter 326.

Figure 4A:
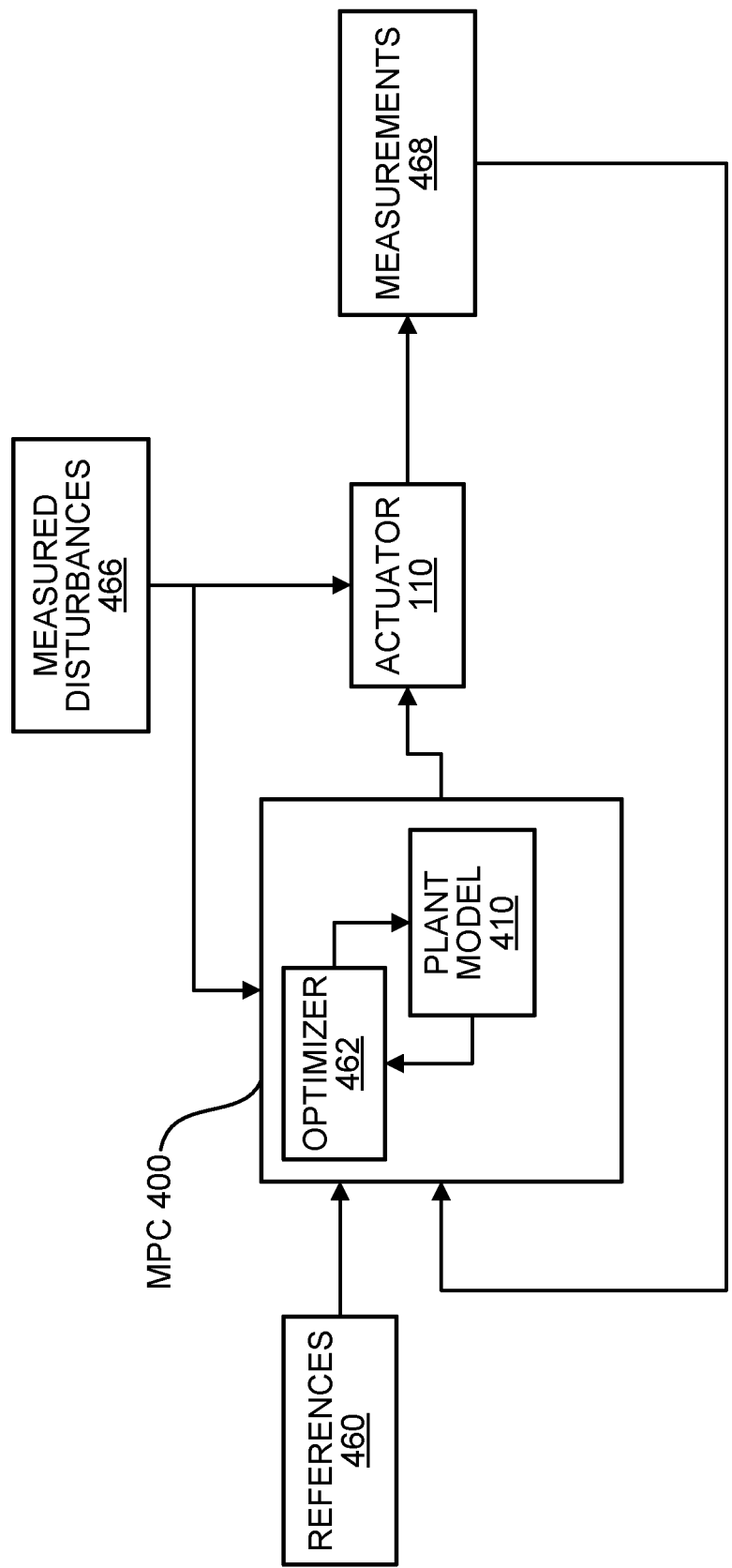
FIGS. 4A-4B illustrate an example Model Predictive Control (MPC) system, in accordance with one or more embodiments.
Figure 4B:
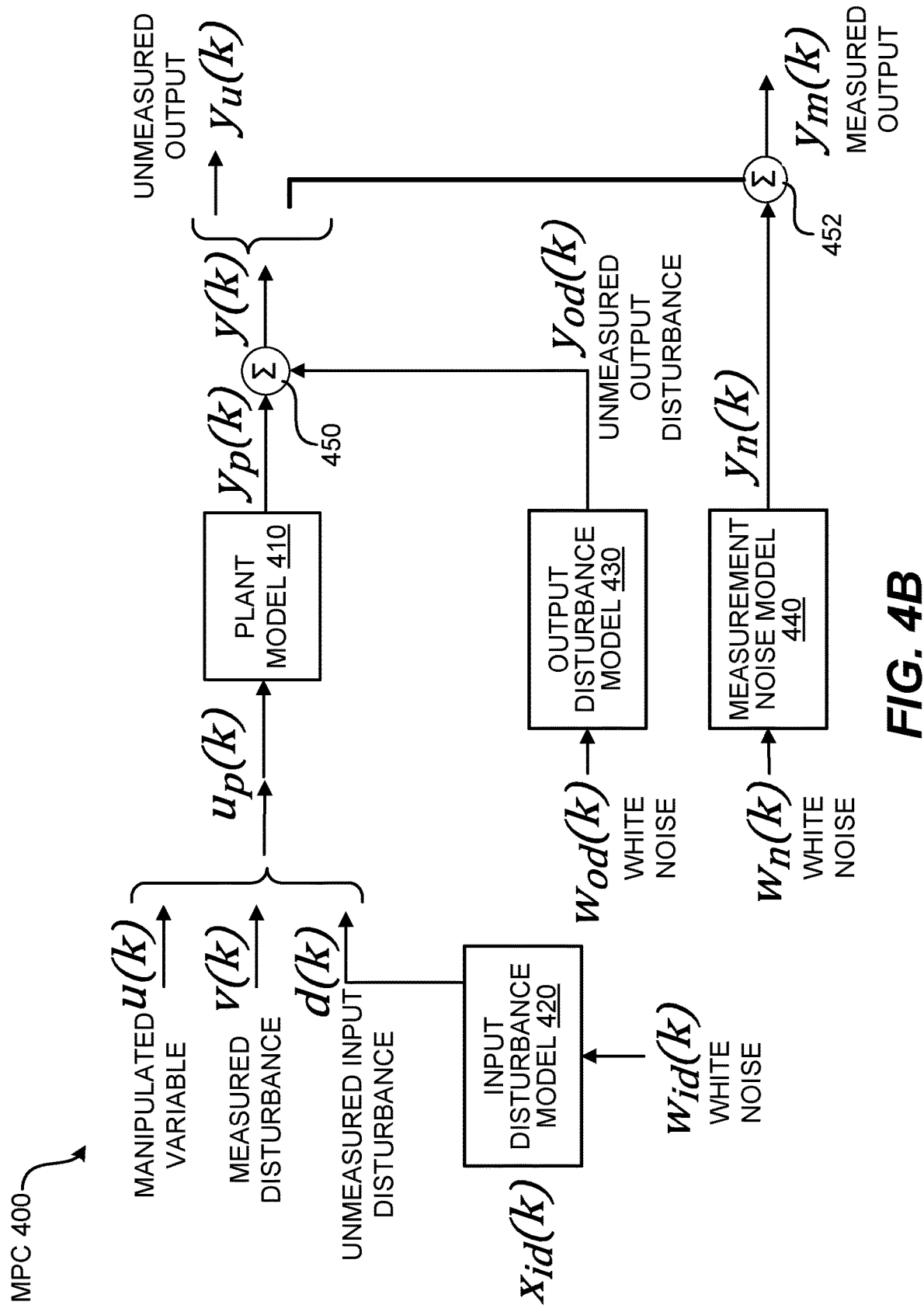

In some embodiments, actuators 110-A and 120-A, as depicted in FIG. 3B, may represent corresponding plant models of such actuators that calculates or predicts the process or behavior of the corresponding actuator, such as plant model 410. In some embodiments, plant models may be implemented within an MPC, as shown in FIGS. 4A and 4B. However, in other embodiments, a plant model may exist separate from the MPC, as shown in FIG. 3B. The following description may be made with reference to the MPC and LQG system corresponding to one actuator. However, it should be recognized that each actuator system in system 301 may include substantially similar configurations.

Synchronization and tracking between actuators are achieved in system 301 using the MPCs. Feedback compensation via the LQGs with integral gains may work on local feedback accounting for compensating against the difference in static forces between actuators. To filter the noise and input disturbances, the LQGs may account for filtering fast dynamic transient noise using a Kalman estimator, a Linear-quadratic Regulator (LQR), and a local MPC that anticipates and nulls force fighting transients to provide optimal local output parameters y(k).

With reference to FIG. 3B, the position command r(k) is fed into the system to be used by the actuators as a reference. In a system where the actuators are the same (same technology and power sources), the outputs of the actuators may be expected to be in sync, regulated, and tracking. However, due to measurement noise and torque disturbances, their outputs may be randomly different, resulting in force fighting. In a system where the actuators are not the same (different technology and power sources), the difference in outputs would be greater and result in dynamic and constant force fighting.

In some embodiments, system 301 may be configured in an open loop or closed loop configuration, as previously described. As shown in FIG. 3B, system 301 is in a closed loop configuration in which slaved switch 340 is implemented to connect the output y(k) of actuator 110-A to the input of actuator 120-A. In an open loop configuration, the slave switch 340 will be implemented to directly feed input command r(k) to actuator 120-A.

To circumvent such force fighting issues, a modern technique in control systems is implemented using MPCs, LQRs, and Kalman filters. The MPCs are used to synchronize the actuators, track the position command r(k), widen stability margins, and to supervise the system as a whole. As shown, a position command r(k) may be input into MPC 311 as a reference command or input command. MPC 311 may use position command r(k) to determine a future manipulated variable u(k) at control interval k for operation of actuator 110-A. In some embodiments, the measured local output parameters y(k) measured from actuator 110-A are used as feedback that is input to one or more of the MPCs and may include parameters, such as, position, force, force fight, etc. In some embodiments, measured disturbances v(k) may be subtracted from actuator output $y_a$(k) measured at actuator 110-A to determine local output parameters y(k). In some embodiments, measured local output parameters y(k) may be determined by subtracting measured disturbances v(k), such as torque disturbances, from the predicted output $y_p$(k) determined by a plant model corresponding to actuator 110-A at 362. A plant model corresponding to actuator 110-A may be plant model 410, further described with reference to FIG. 4A.

Additionally input noise, w(k), may also be input into the MPC, such as MPC 311. Input noise w(k) may be any unwanted energy into the system, i.e. electrical noise, thermal, or mechanical. In described examples, input noise w(k) may be white noise, which is Gaussian, and its power spectral density is nearly equal throughout the frequency range of the system. Input noise w(k) is further described with reference to FIGS. 4A and 4B. Since the MPC 311 is an optimal predictive controller, it finds the best control parameter vector ΔU for the future manipulated variable u(k) at control interval k, such that an error function between the set-point, r(k), and the predicted output, $y_p$(k), is minimized. The defined cost function J that reflects the control objective is given by the following equation:

$$J = (R_s - Y)^T (R_s - Y) + \Delta U^T \overline{R} \Delta U$$

The cost function J reflects the control objective to bring the predicted output Y as close as possible to the set-points $R_s$. $(R_s - Y)^T$ is a transposed matrix. $\overline{R}$ is a diagonal matrix used as a tuning matrix such that if set to zero, then J would solely make the error $(R_s - Y)^T (R_s - Y)$ as small as possible without regard to how large the ΔU is.

A modern technique in noise suppression and disturbance rejection is the use of optimal state feedback, such as LQR 314, with an optimal gain K to provide a further adjusted manipulated variable $u_{LQR}$(k). In some embodiments. LQR 314 takes the future manipulated variable u(k) as input. Input noise w(k) may also be added to the future manipulated variable u(k) at 360 before being input into LQR 314.

In some embodiments, the state feedback law is given by the following equation:

$$u_{LQR}(k) = -K x_{est}(k)$$

where $x_{est}$(k) is an estimate of the full state vector x(k) determined by a Kalman filter, such as Kalman filter 316. Such state feedback law minimizes the quadratic cost function described below with reference to Equation 3. This may specify the tradeoff between performance and cost of control. The adjusted manipulated variable $u_{LQR}$(k) may be fed to actuator 110-A.

In some embodiments, LQR 314 requires a full state vector to function. As such, a Kalman estimator 316 may be used to estimate the full state vector, x(k), as $x_{est}$(k). Therefore, when the other parameters cannot be measured, the Kalman estimator 316 gives a full estimate of the parameters. However, in some embodiments, at least one measured parameter is required to minimize the cost function, or the asymptotic covariance of the error function x(k)−$x_{est}$(k). As shown in FIG. 3B, the adjusted future manipulated variable $u_{LQR}$(k), and/or the measured local output parameters y(k), may be input into the Kalman estimator to determine $x_{est}$(k).

As described, the LQG controller may comprise a combination of the LQR and the Kalman estimator. In some embodiments, an LQG controller may be constructed using MATLAB® (matrix laboratory) by connection of the LQR and the Kalman state estimator via typing trksys=lqgtrack (kest,K), where kest=Kalman (sys, Qn, Rn) and sys is the actuation state space system. MATLAB, which may also be referred to herein as Matlab, is a programming language that provides a multi-paradigm numerical computing environment. In various other embodiments, other appropriate programming language may be implemented to construct the LQG controller.

Model Predictive Controller (MPC)

FIGS. 4A and 4B illustrate an example Model Predictive Control (MPC) system 400, in accordance with one or more embodiments. FIG. 4A depicts a general flow process of a feed-forward control by MPC system 400 on an actuator, such as actuator 110 or 120. FIG. 4B depicts the input variables within the flow process of a feed-forward control by MPC system 400 on an actuator 110.

In various embodiments, a Model Predictive Control (MPC), such as MPC 400, is an advanced, multi-variable, digital control technology that has an internal dynamic model that can predict components behavior of a plant model in the near future. An MPC may also be referred to herein as a receding horizon control. In various embodiments, MPC 400 may include an optimizer 462 and a plant model 410 corresponding to actuator 110.

In various embodiments, MPC 400 integrates feed-forward control to reject measured disturbances 466 and acts as a compensator signal until the system can meet the desired trajectory (including rate and position). MPC 400 may receive various inputs, including references 460 (such as an input command) and measured disturbances 466 which may be measured by various sensors. Other inputs may be included in references 460 and used as input for MPC 400.

At control interval, k, an MPC may utilize such inputs to construct and solve a constrained optimization problem using optimizer 462. Only the first optimal control move is applied in the plant (actuator 110). Additionally, measurements 468 may be made at the actuator, or other part, such as an aileron, to determine the force applied to the part by the actuator. Such measurements 468 may be fed back to MPC 400) as additional input. This process is repeated at control interval k+1 and so on. Thus, the prediction horizon of a given MPC is shifting forward.

The general design objective of model predictive control by an MPC 400 is to compute a trajectory of a future manipulated variable, u(k), at a particular time interval k, to optimize the future behavior of the plant output, y(k). An MPC, using the information derived from the plant model or actuator, may predict what may happen (model), measures the actuator output (measurement) and implements planned activities to obtain the desired trajectories (realization of control).

The MPC enables diagnosis of issues that could lead to run-time failures and provides guidance for tuning weights to improve performance and robustness. By running different scenarios in linear and nonlinear simulations, the controller performance may be evaluated. In some embodiments, controller performance may be adjusted as it runs by tuning weights (i.e. cost function J) and varying constraints. This may be implemented by an optimizer, such as 462. In using optimizer 462, constraints may be set on the lower and upper bounds of the manipulated variable and the plant output variable, y(k).

The adaptive model predictive controllers may be implemented by updating the plant model at run time. For applications with fast sample times, explicit model predictive controllers can be developed. For rapid prototyping and embedded system design, the MATLAB MPC toolbox supports C-code and IEC 61131-3 Structured Text generation.

In various embodiments, an MPC 400 may use plant, disturbance, and noise models for prediction and state estimation. As shown in FIG. 4B, MPC 400 may include plant model 410, input disturbance model 420, output disturbance model 430, and measurement noise model 440.

In various embodiments, the MPC state-space model of MPC 400 may be given by the following equations:

$$x_c(k+1) = Ax_c(k) + Bu_o(k) \quad \text{Equation 1:}$$

$$y(k) = Cx_c(k) + Du_o(k) \quad \text{Equation 2:}$$

Here, $x_c(k+1)$ is the state variable controller vector at interval k+1, $u_o(k)$ is the input variable (or manipulated variable), and y(k) is the process output. A, B, C, and D are constant state-space matrices that represent the plant model.

The controller state $x_c^T(k)$ may include the following variables:

$$x_c^T(k) = [x_p^T(k) x_{id}^T(k) x_{od}^T(k) x_n^T(k)]$$

Here, $x_c$ is the controller state which comprises $n_{xp} + n_{xid} + n_{xod} + n_{xn}$ state variables. The plant model state vector, of length $n_{xp}$, of plant model 410 is represented by the variable, $x_p$. The input disturbance model state vector, of length $n_{xid}$, of input disturbance model 420 is represented by the variable, $x_{id}$. The output disturbance model state vector, of length $n_{xod}$, of output disturbance model 430 is represented by the variable $x_{od}$. The measurement noise model state vector, of length $n_{xn}$, of measurement noise model 440 is represented by the variable, $x_n$.

At a given control interval, k, inputs $u_o^T(k)$ into MPC 400 include the following variables:

$$u_o^T(k) = [u^T(k) v^T(k) w_{id}^T(k) w_{od}^T(k) w_n^T(k)]$$

Here, the input variables of $u_o$ include manipulated variable vector u, measured disturbance vector v, input disturbance white noise vector $w_{id}$, output disturbance white noise vector $w_{od}$, and measurement noise model white noise vector $w_n$. Manipulated variables are adjusted by MPC 400 to achieve synchronization between actuators. Measured disturbances cannot be adjusted by MPC 400, but are utilized by MPC 400 for feedforward compensation.

At a given control interval, k, the plant model 410 contains the state-space model characterization of the plant corresponding to an actuator. This may be given by the following equations:

$$x_p(k+1) = A_p x_p(k) + BS_i u_p(k)$$

$$y_p(k) = S_o^{-1} C x_p(k) + S_o^{-1} DS_i u_p(k)$$

Here, $x_p(k+1)$ is the future state variable of the plant model, $u_p(k)$ represents the aggregate input variables into plant model 410, and $y_p(k)$ is the predicted output of the plant model. In some embodiments, inputs $u_p(k)$ into plant model 410 are independent variables, and may include manipulated variables u(k), measured disturbances v(k), and unmeasured disturbances d(k).

MPC 400 may not have direct knowledge of unmeasured input disturbances d(k), but can compensate for it based on disturbance models. For example, unmeasured input disturbances d(k) may be determined by input disturbance model 420 using input disturbance white noise vector $w_{id}(k)$. Such white noise vector $w_{id}(k)$ may correspond to a general representation of noise originating and coming into the system. AS with w(k), this noise may be represented as Gaussian, with power spectral density nearly equal throughout the systems frequency spectrum.

The input disturbance white noise vector $w_{id}(k)$ is input into input disturbance model 420. Input disturbance model 420 may specify the signal type and characteristics of the input disturbance. The state-space model of input disturbance model 420 may be given by the following equations:

$$x_{id}(k+1) = A_{id} x_{id}(k) + B_{id} w_{id}(k)$$

$$d(k) = C_{id} x_{id}(k) + D_{id} w_{id}(k)$$

At the given control interval, k, outputs of plant model 410 are dependent variables, and may include predicted outputs $y_p(k)$, measured outputs y(k), and unmeasured outputs, $y_u(k)$. Measured outputs y(k) may be determined from summing predicted outputs $y_p(k)$ and unmeasured output disturbances $y_{od}(k)$ at 450. In some embodiments, measured disturbances v(k), such as torque disturbances, may also be subtracted from the predicted outputs $y_p(k)$ at 450.

The output disturbance model 430 may specify the signal type and characteristics of the output disturbance. The state-space model of output disturbance model 430 may be given by the following equations:

$$x_{od}(k+1) = A_{od} x_{od}(k) + B_{od} w_{od}(k)$$

$$y_{od}(k) = C_{od} x_{od}(k) + D_{od} w_{od}(k)$$

Here, $w_{od}(k)$ represents the output disturbance white noise vector that is input into output disturbance model 430.

Measured outputs y(k) may be used to estimate unmeasured quantities and feedback designated by unmeasured outputs $y_u(k)$ which may be estimated by MPC 400 based on available measurements and other outputs of plant model 410. In some embodiments, unmeasured outputs $y_u(k)$ may be the difference between predicted outputs $y_p(k)$ and measured outputs y(k) at 450. In some embodiments, $y_u(k) = y_m(k) - y_n(k)$ at 452.

In some embodiments, the measured outputs y(k) may be added to the noise signal output $y_n(k)$ determined by the measurement noise model 440 at 452 to determine a measured output $y_m(k)$. Output $y_u(k)$ may also be an unmeasured output, $y_a(k)$ from an actuator 110. In some embodiments, $y_a(k)$ may also include other unmeasured output variables for which the system does not have a means of direct (sensor) measurements. The measurement noise model 440 specifies the measurement noise signal type and characteristics. The state-space model of measurement noise model 440 may be given by the following equations:

$$x_n(k+1) = A_n x_n(k) + B_n w_n(k) \quad \text{Equation 1:}$$

$$y_n(k) = C_n x_n(k) + D_n w_n(k) \quad \text{Equation 2:}$$

Here $w_n(k)$ is the dimensionless white noise input into the measurement noise model 440. The aforementioned state-state equations may be simplified by simplifying Equation 1 and Equation 2. Equation 1 simplifies to Equation 1.1:

$$x_c(k+1) = A_c x_c(k) + B_c u(k)$$

Equation 2 simplifies to Equation 1.2:

$$y(k) = C_c x_c(k)$$

Here, u is the manipulated variable or input variable into the plant models; y is the process output, and $x_c$ is the state variable vector.

A general formulation of a state-space model has a direct term from the input signal u(k) to the output y(k) as:

$$y(k) = C_c x_c(k) + D_c u(k)$$

However, due to the principle of receding horizon control, $D_c$ may be assumed to be $D_c = 0$ in the plant model.

Since u(k) represents the trajectory to optimize the desired output, $\Delta u(k)=u(k)-u(k-1)$, the augmented state-state model for x and y may be:

$$\Delta x_c(k+1) = A_c \Delta x_c(k) + B_c \Delta u(k) \quad \text{Equation 1.3}$$

$$y(k+1) - y(k) = C_c(x_c(k+1) - x_c(k)) = C_c \Delta x_c(k+1) \quad \text{Equation 1.4}$$
$$= C_c A_c \Delta x_c(k) + C_c B_c \Delta u(k)$$

For a plant modeled as, $x(k+1)=f(x(k))$; $u(k)$, an input $u(k)$ is determined at each time slot k based on $x(k)$. The input may be selected as to minimize predicted costs over the planning horizon k, k+1, ... k+N. Here, N is the length of the planning horizon. Once $u(k)$ is determined, the control $u(k)$ is applied and at time k+1 the process is repeated.

The predicted control trajectory may be determined by using Equations 1.3 and 1.4, to find the augmented state-state model as:

$$\overbrace{\begin{bmatrix} \Delta x_m(k+1) \\ y(k+1) \end{bmatrix}}^{x(k+1)} = \overbrace{\begin{bmatrix} A_m & o_m^T \\ C_m A_m & 1 \end{bmatrix}}^{A} \overbrace{\begin{bmatrix} \Delta x_m(k) \\ y(k) \end{bmatrix}}^{x(k)} + \overbrace{\begin{bmatrix} B_m \\ C_m B_m \end{bmatrix}}^{B} \Delta u(k)$$

$$y(k) = \overbrace{[o_m \ 1]}^{C} \begin{bmatrix} \Delta x_m(k) \\ y(k) \end{bmatrix},$$

Then, the predicted future control trajectory may be given by:

$$\Delta u(k_i), \Delta u(k_i+1), \ldots \Delta u(k_i+N_c-1)$$

where $N_c$ is the control time interval.

The future state variables may be given by:

$$x(k_i+1|k_i), x(k_i+2|k_i), \ldots, x(k_i+m|k_i), \ldots, x(k_i+N_p|k_i)$$

where $N_p$ is the prediction time interval.

Therefore, the future state variables may be calculated as:

$$x(k_i+1|k_i) = Ax(k_i) + B\Delta u(k_i)$$

$$x(k_i+2|k_i) = Ax(k_i+1|k_i) + B\Delta u(k_i+1)$$
$$= A^2 x(k_i) + AB\Delta u(k_i) + B\Delta u(k_i+1)$$

$$\ldots$$

$$x(k_i+N_p|k_i) = A^{N_p} x(k_i) + A^{N_p-1} B\Delta u(k_i) + A^{N_p-} 2B\Delta u(k_i+1) + \cdots + A^{N_p-} N_c B\Delta u(k_i+N_c-1)$$

From the predicted state variables, the predicted output variables are, by substitution:

$$y(k_i+1|k_i) = CAx(k_i) + CB\Delta u(k_i)$$

$$y(k_i+2|k_i) = CA^2 x(k_i) + CAB\Delta u(k_i) + CB\Delta u(k_i+1)$$

$$y(k_i+3|k_i) = CA^3 x(k_i) + CA^2 B\Delta u(k_i) + CAB\Delta u(k_i+1) + CB\Delta u(k_i+2)$$

$$\ldots$$

$$y(k_i+N_p|k_i) = CA^{N_p} x(k_i) + CA^{N_p-1} B\Delta u(k_i) + CA^{N_p-2} B\Delta u(k_i+1) + \ldots + CA^{N_p-N_c} B\Delta u(k_i+N_c-1)$$

All predicted variables may be formulated in terms of current state variable information $x(k_i)$ and the future control movement $\Delta u(k_i+j)$, where $j=0, 1, \ldots N_c-1$. The following vectors may be defined as:

$$Y = [y(k_i+1|k_i) y(k_i+2|k_i) y(k_i+3|k_i) \ldots y(k+N_p|k_i)]^T$$

$$\Delta U = [\Delta u(k_i) \Delta u(k_i+1) \Delta u(k_i+2) \ldots \Delta u(k_i+N_c-1)]^T$$

where in the single-input and single-output case, the dimension of Y is $N_p$ and the dimension of $\Delta U$ is $N_c$. A compact matrix may be formed as $Y = Fx(k_i) + \Phi \Delta U$.
where $$F = \begin{bmatrix} CA \\ CA^2 \\ CA^3 \\ \vdots \\ CA^{N_p} \end{bmatrix}; \Phi = \begin{bmatrix} CB & 0 & 0 & \ldots & 0 \\ CAB & CB & 0 & \ldots & 0 \\ CA^2 B & CAB & CB & \ldots & 0 \\ \vdots & & & & \\ CA^{N_p-1} B & CA^{N_p-2} B & CA^{N_p-3} B & \ldots & CA^{N_p-N_n} B \end{bmatrix}$$

For a given set-point signal $r(k_i)$ at sample time $k_i$, within a prediction horizon, the objective of the predictive control system is to bring the predicted output as close as possible to the set-point signal. The optimal control parameter vector $\Delta U$ may be found such that an error function between the set-point and the predicted output is minimized. The cost function J that reflects the control objective may be defined as:

$$J = (R_s - Y)^T (R_s - Y) + \Delta U^T R \Delta U$$

where $R_s$ is a data vector containing the set-point information, and R is a diagonal matrix in the form of $$R = r_w I N_c \times N_c (r_w \geq 0)$$

where $r_w$ is a tuning parameter for the desired closed-loop performance.

To find the optimal $\Delta U$ that will minimize J, J may be expressed as:

$$J = (R_s - Fx(k_i))^T (R_s - Fx(k_i)) - 2\Delta U^T \Phi^T (R_s - Fx(k_i)) + \Delta U^T (\Phi^T \Phi + ^{-R}) \Delta U$$

Therefore, the optimal solution for the control signal U is:

$$\Delta U = (\Phi^T \Phi + ^{-R})^{-1} \Phi^T (R_s - Fx(k_i))$$

where $(\Phi^T \Phi + ^{-R})^{-1} \Phi^T R_s$ corresponds to the set-point change, while $-(\Phi^T \Phi + ^{-R})^{-1} \Phi^T F$ corresponds to the state feedback control within the framework of predictive control.

Linear-Quadratic Gaussian Controller—Linear-Quadratic Regulator

As previously described, a Linear Quadratic Gaussian controller, or LQG controller, is servo controller which operates an LQR with a Kalman filter. As described an LQG may include LQR 314 and Kalman filter 316. As another example, an LQG may include LQR 324 and Kalman filter 326. In the embodiments described herein, an LQG controller may be integrated with an MPC in an AFFC system comprising hybrid (EHA/EHSA) or dual (EMA/EMA) actuator systems operating on a common control surface. The integration of an MPC, LQG control, and a Linear Quadratic Regulator (LQR) provides an AFFC system that demonstrates the optimum feedback compensation for rejecting force fight disturbances.

As previously described, an LQR is an optimal gain (K) regulator that forces the output $u_{LQR}(k)$ to state (0). The LQR may use full state feedback when all the states are measured. However, when not all the states are measured directly, the LQR may use estimated states determined by a Kalman estimator. Where not all the states are measured, the estimated state vector $x_{est}(k)$ of the Kalman estimator output is used to calculated gain K that minimizes a cost function:

$$J(u)=\int_0^\infty (x^TQx+u^TRu+2x^TNu)dt \quad \text{Equation 3:}$$

The cost function may also be given by:

$$J(u)=\int_0^T (x(t)'Qx(t)+u(t)'Ru(t))dt+x(T)'Q_f x(T)$$

For a discrete-time S-S model, the cost function may be given by:

$$J = \sum_{n=0}^{\infty} \{x^TQx + u^TRu + 2x^TNu\}$$

$$J(u) = \sum_{k=0}^{N-1} (x(k)'Qx(k) + u(k)'Ru(k)) + x(N)'Q_f x(N)$$

Here Q is a state weighting matrix, R is a control weighting matrix, and the time horizon T or N may be finite or infinite.

The cost structure or similar for discrete time attempts to find a control u(t); t 2 [0;T] that will "regulate" the system at "0". The payment is quadratic for both state and control effort. Typical choices for Q may be: Q=11, or Q=I, or Q=diag($q_i$), where $q_i \geq 0$. A typical choice for R may be R=diag($r_i$), where $r_i > 0$. The time horizon, T or N, is often taken as $\alpha$.

In some embodiments the LQR gain K may be derived using the following MATLAB statement:

$$[K,S,e]=lqr(SYS,Q,R,N)$$

This command may compute the optimal gain K for which the state feedback law u=-Kx minimizes the quadratic cost function of the equation: $J(u)=\int_0^\infty (x^TQx+u^TRu+2x^TNu)dt$. Here, the weights Qx, Qi, and R are the tuning knobs. N is an additional type of cost term, 2x(t)0Nu(t). For the return values, -K is the state feedback gain matrix; S is the solution of the algebraic Riccati equation, and e is the resulting closed loop eigenvalues (i.e. the eigenvalues of A −BK). In practice this is often the preferred way of deriving an initial controller before making finer refinements (based on simulations and tests).

In various embodiments, optimization by the LQR may be an optimal control that is given by the following linear state feedback control law:

$$u(t)=(-R^{-1}B'P(t))x(t)$$

Here, the n-by-n matrix P(t) is the solution of a Riccati differential equation.

The following Riccati matrix differential equation may be used to find the state feedback control law of continuous time LQR, solved for $\{P(t), t\in[0, T]\}$:

$$-\dot{P}(t)=A'P(t)+P(t)A-P(t)BR^{-1}B'P(t)+Q, P(T)=Q_f$$

This equation may be specified "backward in time." If T=∞, the steady state solution P of the Riccati differential equations replaces P(t) in the optimal control law. This P is the unique positive definite solution of the algebraic Riccati equation:

$$0=A'P+PA-PBR^{-1}B'P+Q$$

The optimal control is given by:

$$u(t)=(-R^{-1}B'P(t))x(t), \text{ or}$$

$$u(t)=(-R^{-1}B'P)x(t)$$

The optimal control may also be given by the following linear state feedback control law:

$$u(k)=(-(R+B'P(k+1)B)^{-1}B'P(k+1)A)x(k)$$

Here, the n-by-n matrix P(k) is the solution of a Riccati difference equation.

The following Riccati matrix difference equation may be used for discrete time, solved for $\{P(t), k\in\{0, \ldots, N\}\}$:

$$P(k)=Q+A'P(k+1)A-A'P(k+1)B(R+B'P(k+1)B)^{-1}B'P(k+1)A, P(N)=Q_f$$

If N=∞, the steady state solution P replaces P(k). This P is the unique positive definite solution found by the algebraic Riccati equation:

$$P=Q+A'PA-A'PB(R+B'PB)^{-1}B'PA$$

The optimal control is given by:

$$u(k)=(-(R+B'P(k+1)B)^{-1}B'P(k+1)A)x(k), \text{ or}$$

$$u(k)=(-(R=B'PB)^{-1}B'PA)x(k)$$

Further, if T=1 (or N=1), the terms P(t) (or P(k)) are replaced by a constant matrix that is a solution of associated Riccati algebraic equations. In some embodiments, different versions may be used for discrete and continuous time.

In various embodiments, and LQR may be used for tracking some desired trajectory, ~x( ). In the simplest case, this trajectory is a non-zero desired constant set point, ~x. The solution for desired trajectories may be presented as a separate problem, such as an open-loop optimal control that is based on calculus of variations. For example, the objective may be formulated as:

$$J_{\bar{x}}(u)=\int_0^\infty ((x(t)-\bar{x}(t))'Q(x(t)-\bar{x}(t))+u(t)'Ru(t))dt$$

Linear-Quadratic Gaussian Controller—Kalman Estimator

For a system described by the state-space model, $x_c(k+1)=Ax_c(k)+Bu_o(k)$, the value for x can be estimated for a full state vector X and taking into account disturbance and noise vectors. The estimation may be performed as follows:

Step 1—the predicted state is:

$$x_c(k_p)=A_c x_c(k-1)+B_c u(k)+w(k)$$

Step 2—the predicted process covariance matrix may be given as:

$$P_{kp}=A_c p_{k-1}A_c^T+Q_k$$

Step 3—the Kalman gain K may be calculated as:

$$K=P_{kp}H^T/(HP_{kp}H^T+R)$$

where R is the sensor noise covariance matrix.

Step 4—a new observation is provided as:

$$Y_k=C_c Y_{kc}+Z_k$$

Step 5—the current state is provided as:

$$x_c(k)=x_c(k_p)+KG[Y_k-Hx_c(k_p)]$$

Step 6—the covariance process is updated with:

$$P_k=(I-KH)P_{kp}$$

Step 7—returns to Step 1 for subsequent iterations where $x_c(k) \geq x_c(k-1)$, and $P_{kp} \geq P_{k-1}$.

In some embodiments, a Kalman Filter may be implemented. A Kalman Filter may describe an optimal estimator used when dealing with Gaussian white noise. The Kalman state estimator may be derived using the following MATLAB statement:

$$[kest,L,P]=Kalman(sys,Qn,Rn,Nn)$$

$$x(\text{est}) = Ax + Bu + Gw$$

$$y = Cx + Du + Hw + v$$

Here, L is the Kalman Gain, P is the covariance matrix, and w and v are modelled as white noise.

The software may then generate the estimate using the following:

$$\frac{d}{dt}\hat{x} = A\hat{x} + Bu + L(y - C\hat{x} - Du)$$

Here, u corresponds to the controls, and y corresponds to measurements. Additionally, $$Qn = E(ww^T), Rn = E(vv^T), Nn = E(wv^T)$$

This minimizes the asymptotic covariance:

$$\lim_{t \to \infty} E\big((x - \hat{x})(x - \hat{x})^T\big) \quad \text{Equation 4}$$

with an estimation error, x−x(est).

FIG. 5A illustrates an example of an LQG regulator 501, in accordance with one or more embodiments. LQG regulator 501 comprises LQR 514-A and Kalman estimator 516-A. In some embodiments, LQR 514-A may be LQR 314 or 324. In some embodiments, Kalman filter 516-A may be Kalman filter 316 or 326. Given the LQR and the Kalman estimator described above, the LQG may be formed by combining them. In some embodiments, MATLAB may be used to form the LQG regulator. In some embodiments, the Kalman filter kest and LQ-optimal gain K may be connected using the command:

regulator=$lqg$reg(kest,K)

This command forms the LQG regulator as shown in FIG. 5A. In various embodiments, the configuration shown in FIG. 5A ensures that the output y(k) of the actuator is at state (0).

FIG. 5B illustrates an example of an LQG servo controller 502, in accordance with one or more embodiments. LQG servo controller 502 comprises LQR 514-B and Kalman estimator 516-B. In some embodiments, LQR 514-B may be LQR 314 or 324.

In some embodiments, Kalman filter 516-B may be Kalman filter 316 or 326. LQG servo controller 502 may further comprise integrator 520. In some embodiments, LQG servo controller 502 may be formed in MATLAB by connecting the Kalman filter, kest, and LQ-optimal gain K busing the following command:

servocontroller=$lqg$tract(kest,K)

This command forms the LQG regulator as shown in FIG. 5B. In various embodiments, the configuration shown in FIG. 5B ensures that the output y(k) of the actuator tracks the reference command r(k) while rejecting input noise w(k) and torque disturbance v(k).

Referring back to FIG. 3B, the system 301 represents an example of an MPC-LQR Model with feed-forward and feedback compensation, in accordance with one or more embodiments. This system 301 demonstrates the optimum feedback compensation using LQRs, as well as the adaptive feedforward compensation using MPCs. According to various embodiments, feedback compensation is achieved using Linear Quadratic Gaussian Servo Controller for each actuator and feedforward compensation is achieved using the MPCs.

This system further demonstrates the optimum feedback compensation between the SHA and the EHA on the aileron. In some embodiments, feedback compensation is achieved using Linear Quadratic Gaussian Servo Controller for each actuator. The servo controller ensures that the position output tracks the reference command while rejecting force fight disturbances.

This system demonstrates the force fighting feedback compensation between a servo-hydraulic actuator (SHA) and an electro-hydraulic actuator (EHA) on an aileron surface. According to various embodiments, force fighting feedback compensation is achieved using MPCs for each actuator. As shown, each MPC controller is applied locally to the respective actuator. The main controls for the position commands of an actuator are the manipulated variables of the MPC.

The outputs of an actuator are then fed back into the plant's inner loop compensators and the MPC. As illustrated, force fighting output is fed back into the MPCs as measured disturbance inputs. This influences the dynamic response when the measured force fighting deviates from zero. If the disturbance model predicts a sustained value, MPC adjustments will continue until the plant output returns to zero. Thus, the MPC ensures that the system is maintained within operating limits for a very wide variation of force fighting errors.

Examples of Aircraft and Methods of Fabricating and Operating Aircraft

Figure 6:
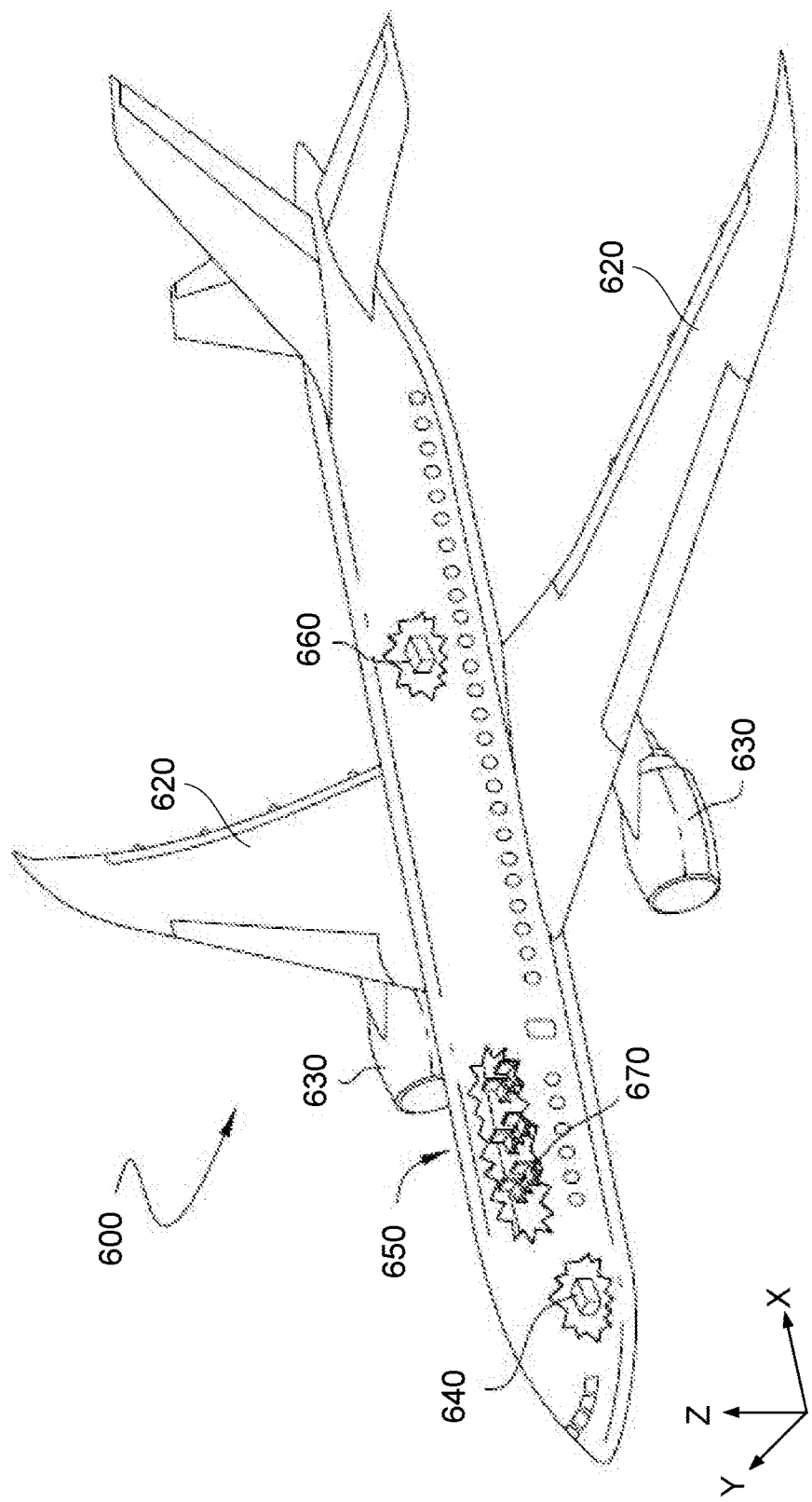
FIG. 6 is a schematic illustration of an aircraft, in accordance with one or more embodiments of the present disclosure.

To better understand various aspects of implementation of the described systems and techniques, a brief description of an aircraft and aircraft wing is now presented. FIG. 6 is a schematic illustration of aircraft 600, in accordance with some embodiments. As depicted in FIG. 6, aircraft 600 is defined by a longitudinal axis (X-axis), a lateral axis (Y-axis), and a vertical axis (Z-axis). In various embodiments, aircraft 600 comprises airframe 650 with interior 670. Aircraft 600 includes wings 620 coupled to airframe 650. Aircraft 600 may also include engines 630 supported by wings 620. In some embodiments, aircraft 600 further includes a number of high-level inspection systems such as electrical inspection system 640 and environmental inspection system 660. In other embodiments, any number of other inspection systems may be included.

Aircraft 600 shown in FIG. 6 is one example of a vehicle of which components may be fabricated, modified, or machined to include at least one of systems 100, 200, 300, and 301, in accordance with illustrative embodiments. Although an aerospace example is shown, the principles disclosed herein may be applied to other industries, such as the automotive industry. Accordingly, in addition to aircraft 600, the principles disclosed herein may apply to other vehicles, e.g., land vehicles, marine vehicles, space vehicles, etc.

Figure 7:
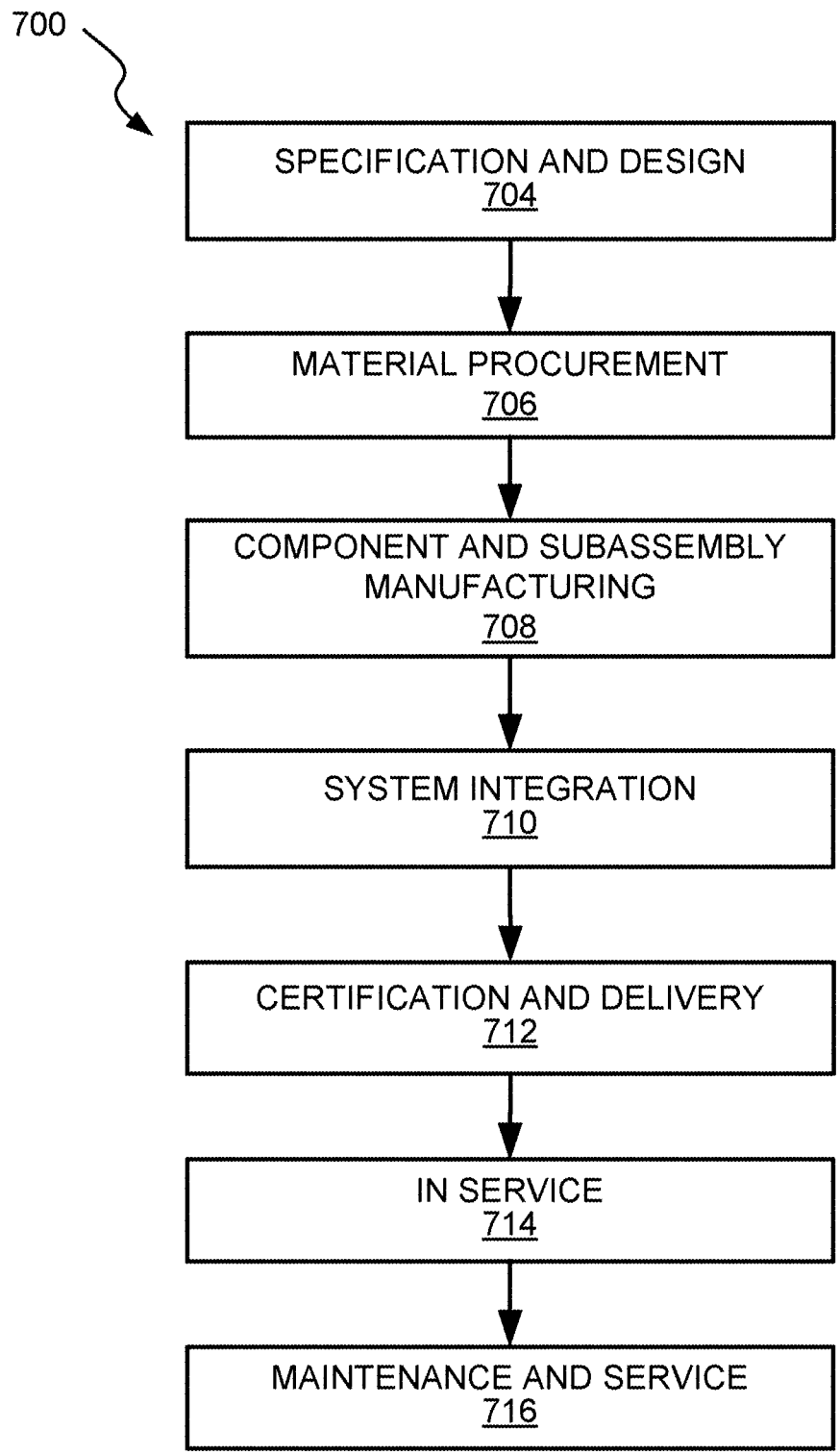
FIG. 7 is a block diagram of aircraft production and service methodology that may utilize methods and assemblies described herein.

Examples of the present disclosure may be described in the context of aircraft manufacturing and service method 700 as shown in FIG. 7 and aircraft 600 as shown in FIG. 6. During pre-production, illustrative method 700 may include specification and design (block 704) of aircraft 600 and material procurement (block 706). During production, component and subassembly manufacturing (block 708) and inspection system integration (block 710) of aircraft 600 may take place. Described devices and assemblies, and corresponding methods, can be used in any of specification and design (block 704) of at least one of aircraft 600, material procurement (block 706), component and subassembly manufacturing (block 708), and inspection system integration (block 710) of aircraft 600.

Thereafter, aircraft 600 may go through certification and delivery (block 712) to be placed in service (block 714). While in service, aircraft 600 may be scheduled for routine maintenance and service (block 716). Routine maintenance and service may include modification, reconfiguration, refurbishment, etc. of one or more inspection systems of aircraft 600. Described devices and assemblies, and corresponding methods, can be used in any of certification and delivery (block 712), service (block 714), and routine maintenance and service (block 716).

Each of the processes of illustrative method 700 may be performed or carried out by an inspection system integrator, a third party, or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

System(s), apparatus(es), and corresponding method(s) shown or described herein may be employed during any one or more of the stages of manufacturing and service method (illustrative method 700). For example, components or subassemblies corresponding to component and subassembly manufacturing (block 708) may be fabricated or manufactured in a manner similar to components or subassemblies produced while aircraft 600 is in service (block 714). Also, one or more examples of the system(s), apparatus(es), method(s), or combination thereof may be utilized during production stages (block 708) and (block 710), for example, by substantially expediting assembly of or reducing the cost of aircraft 600. Similarly, one or more examples of the systems, apparatus, or method realizations, or a combination thereof, may be utilized, for example and without limitation, while aircraft 600 is at least one of in service (block 714) and during maintenance and service (block 716).

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. A drive controller unit comprising:
   a first feedforward controller configured to receive a drive command signal, the first feedforward controller being in communication with a first actuator;
   a first feedback regulator configured to output a first feedback input into the first feedforward controller, the first feedback regulator being further configured to receive as input a first actuator position and a first actuator force;
   a second feedforward controller configured to receive the drive command signal, the second feedforward controller being in communication with a second actuator; and
   a second feedback regulator configured to output a second feedback input into the second feedforward controller, the second feedback regulator being further configured to receive as input a second actuator position and a second actuator force,
   wherein the drive controller unit utilizes both feedforward controllers and both feedback regulators to minimize force fighting while driving a common aileron.

2. The drive controller unit of claim 1, wherein the feed forward controllers include an internal plant model that predicts actuator behavior.

3. The drive controller unit of claim 1, wherein the feed forward controllers include an internal optimizer configured to construct and solve a constrained optimization problem at control interval k.

4. The drive controller unit of claim 1, wherein the feedback regulators are configured as inner loop noise suppressors and plant disturbance compensators.

5. The drive controller unit of claim 1, wherein the feedback regulators are configured as linear quadratic Gaussian controllers (LQGs).

6. The drive controller unit of claim 5, wherein the LQGs include a linear quadratic regulator (LQR) and a Kalman estimator.

7. The drive controller unit of claim 6, wherein the Kalman estimator takes as input U(k) and Y(k), where U(k) is the output of the LQR and Y(k) is the output of an actuator plus torque disturbance, and outputs X(k), which is fed back into the LQR as input.

8. The drive controller unit of claim 7, wherein Y(k) corresponds to position, current, speed, force, and pressure and is fed back into the feedforward controller as additional input.

9. The drive controller unit of claim 1, wherein the drive controller unit is further configured to reject dynamic transient force fighting using digital filter and forward looking algorithms that anticipate and null position, force, and force fight transients.

10. The drive controller unit of claim 1, wherein the feedforward controllers include local feedback compensators that account for compensating against differences in static and dynamic forces between the first and second actuators.

11. An aircraft comprising:
    a processor;
    an aileron;
    a first actuator;
    a second actuator;
    a first feedforward controller configured to receive a drive command signal from the processor, the first feedforward controller being in communication with the first actuator;
    a first feedback regulator configured to output a first feedback input into the first feedforward controller, the first feedback regulator being further configured to receive as input a first actuator position and a first actuator force;
    a second feedforward controller configured to receive the drive command signal, the second feedforward controller being in communication with the second actuator; and
    a second feedback regulator configured to output a second feedback input into the second feedforward controller, the second feedback regulator being further configured to receive as input a second actuator position and a second actuator force, wherein the aircraft utilizes both feedforward controllers and both feedback regulators to minimize force fighting while driving the aileron.

12. The aircraft of claim 11, wherein the feed forward controllers include an internal plant model that predicts actuator behavior.

13. The aircraft of claim 11, wherein the feed forward controllers include an internal optimizer configured to construct and solve a constrained optimization problem at control interval k.

14. The aircraft of claim 11, wherein the feedback regulators are configured as inner loop noise suppressors and plant disturbance compensators.

15. The aircraft of claim 11, wherein the feedback regulators are configured as linear quadratic Gaussian controllers (LQGs).

16. The aircraft of claim 15, wherein the LQGs include a linear quadratic regulator (LQR) and a Kalman estimator.

17. The aircraft of claim 16, wherein the Kalman estimator takes as input U(k) and Y(k), where U(k) is the output of the LQR and Y(k) is the output of an actuator plus torque disturbance, and outputs X(k), which is fed back into the LQR as input.

18. The aircraft of claim 17, wherein Y(k) corresponds to position, current, speed, force, and pressure and is fed back into the feedforward controller as additional input.

19. The aircraft of claim 11, wherein the aircraft is further configured to reject dynamic transient force fighting using digital filter and forward looking algorithms that anticipate and null position, force, and force fight transients.

20. The aircraft of claim 11, wherein the feedforward controllers include local feedback compensators that account for compensating against differences in static and dynamic forces between the first and second actuators.

21. A force fighting compensation system comprising:
 a first feedforward controller configured to receive a drive command signal, the first feedforward controller being in communication with a first actuator;
 a first feedback regulator configured to output a first feedback input into the first feedforward controller, the first feedback regulator being further configured to receive as input a first actuator position and a first actuator force;
 a second feedforward controller configured to receive the drive command signal, the second feedforward controller being in communication with a second actuator, and
 a second feedback regulator configured to output a second feedback input into the second feedforward controller, the second feedback regulator being further configured to receive as input a second actuator position and a second actuator force,
 wherein the force fighting compensation system utilizes both feedforward controllers and both feedback regulators to minimize force fighting while driving a common aileron.

22. The force fighting compensation system of claim 21, wherein the feed forward controllers include an internal plant model that predicts actuator behavior.

23. The force fighting compensation system of claim 21, wherein the feed forward controllers include an internal optimizer configured to construct and solve a constrained optimization problem at control interval k.

24. The force fighting compensation system of claim 21, the feedback regulators are configured as inner loop noise suppressors and plant disturbance compensators.

25. The force fighting compensation system of claim 21, wherein the feedback regulators are configured as linear quadratic Gaussian controllers (LQGs).

26. The force fighting compensation system of claim 25, wherein the LQGs include a linear quadratic regulator (LQR) and a Kalman estimator.

27. The force fighting compensation system of claim 26, wherein the Kalman estimator takes as input U(k) and Y(k), where U(k) is the output of the LQR and Y(k) is the output of an actuator plus torque disturbance, and outputs X(k), which is fed back into the LQR as input.

28. The force fighting compensation system of claim 27, wherein Y(k) corresponds to position, current, speed, force, and pressure and is fed back into the feedforward controller as additional input.

29. The force fighting compensation system unit of claim 21, wherein the force fighting compensation system is further configured to reject dynamic transient force fighting using digital filter and forward looking algorithms that anticipate and null position, force, and force fight transients.

30. The force fighting compensation system of claim 21, wherein the feedforward controllers include local feedback compensators that account for compensating against differences in static and dynamic forces between the first and second actuators.

* * * * *